United States Patent
Piretti

[11] 4,117,784
[45] Oct. 3, 1978

[54] DISASSEMBLABLE TABLE

[75] Inventor: Giancarlo Piretti, Bologna, Italy

[73] Assignee: Societa Anonima Castelli s.a.s. Di C. Castelli & C., Bologna, Italy

[21] Appl. No.: 708,435

[22] Filed: Jul. 26, 1976

Related U.S. Application Data

[63] Continuation of Ser. No. 504,960, Sep. 11, 1974, abandoned, which is a continuation of Ser. No. 289,133, Sep. 14, 1972, abandoned.

[30] Foreign Application Priority Data

Sep. 14, 1971 [IT] Italy .................... 52866 A/71

[51] Int. Cl.² .................................. A47B 13/02
[52] U.S. Cl. ................................. 108/150; 108/153;
248/188; 248/188.7; 403/253; 403/381
[58] Field of Search ...................... 108/150, 153;
248/188.7, 165, 158, 159, 151, 188; 403/253,
334, 187, 381, 331

[56] References Cited

U.S. PATENT DOCUMENTS

| 1,297,436 | 3/1919 | Bolens | 248/188.7 |
|---|---|---|---|
| 1,717,142 | 6/1929 | Bump | 248/188.7 |
| 2,514,109 | 7/1950 | Walsh | 248/158 |
| 2,962,170 | 11/1960 | Best | 403/187 |
| 3,078,063 | 2/1963 | Frankl | 248/188.7 |
| 3,151,830 | 10/1964 | Giacomini | 248/188.7 |
| 3,153,524 | 10/1964 | Greenfield et al. | 248/188.7 |
| 3,719,340 | 3/1973 | Norton | 248/188.7 |

FOREIGN PATENT DOCUMENTS

| 1,457,643 | 9/1966 | France | 248/188 |
|---|---|---|---|
| 1,513,248 | 1/1968 | France | 108/153 |

Primary Examiner—Roy D. Frazier
Assistant Examiner—William E. Lyddane
Attorney, Agent, or Firm—Lackenbach, Lilling & Siegel

[57] ABSTRACT

A disassemblable table comprising at least a vertical column carrying the table-top and connected thereto in any detachable manner and provided at its lower end with a number of foot members extending radially outwardly from the base of said column, characterized by the fact that said foot members are connected to said column by means of a replaceable base mounting comprising a number of joint members augularly spaced away from each other and adapted to engage complementary joint members, each arranged at the inner end of foot member, and wherein at least one of said foot members may be substituted by a horizontal cross bar, having ends shaped as joint members and designed to connect one column to another in the case that the table has at least two columns, dismountable means connecting together said frame, to each column and relative mounting, extending axially thereacross.

3 Claims, 7 Drawing Figures

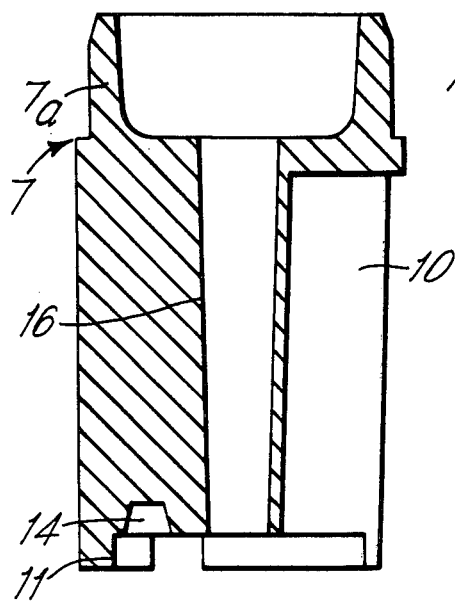
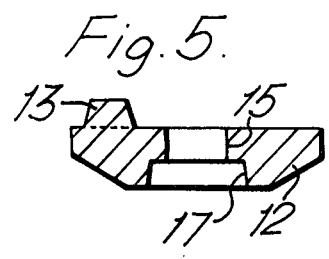
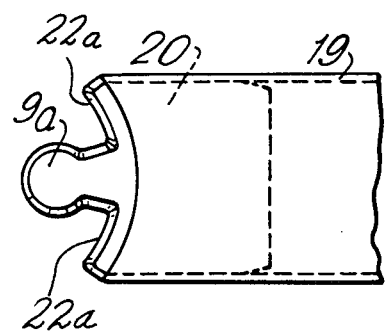
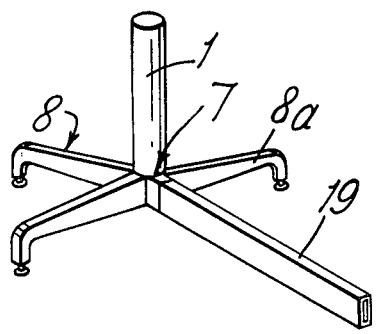

DISASSEMBLABLE TABLE

CROSS-REFERENCES

This is a continuation of application Ser. No. 504,960, filed Sept. 11, 1974, now abandoned, which is a continuation also of application Ser. No. 289,133, filed Sept. 14, 1972, now abandoned.

The present invention relates to a disassemblable table comprising one or more vertical columns which are connected to each other at their upper parts by means of a rigid frame, provided to support, in any dismountable manner, a table-top, while at the lower end each column is provided with a mounting comprising means for the connection, in a detachable manner, of a number of foot members extending radially outwardly from said mounting, at least one of said foot members being substituted by a horizontal bar, in the case wherein the table has more than one carrying column, while said frame supporting the table-top, each column, and mounting provided with the plurality of foot members, which are associated therewith, are locked together by a single vertical threaded rod extending thereacross and co-operating with a threaded locking nut, which firmly connects together said parts in their operative mutual position.

With the exception of the provision of said threaded rod and nut, the foot members and optionally one or more bracing bars are connected to said mounting, in a dismountable manner, by groove and tongue joints, comprising a male member of said joints provided at the end of each foot member and a number of female members of said joints arranged into said mounting. Nothing forbids to arrange tongue joints on said mounting and a groove joint at the inner end of each foot member, even if the first solution is more convenient from a structural point of view.

Said mounting can be shaped so as to allow to perform the connection of three, four or more foot members so that, when a plurality of foot members and a number of columns are available, as well as mountings including different numbers of groove or tongue joints, tables of different designs can be composed, differently combining said components, wherein each table-top is supported by a single rigid frame carried by one or more columns each having three or more feet.

The frame provided to carry the table-top at the upper end of the column or columns is shaped and constructed in any convenient manner.

The table of this invention can thus be assembled and disassembled quickly and easily, by only inserting or removing a long threaded rod which serves to connect and lock together all the components of each carrying structure of said table.

The invention will be hereinafter particularly described, by way of example only with reference to the accompanying drawings, of which:

FIG. 4 is a vertical sectional view of the mounting, taken on the line A—A of FIG. 3;

FIG. 5 is the corresponding sectional view of a boss designed to lock the groove and tongue joints connecting the foot members to said mounting and concurrently to house and lock the shaped head of the through threaded rod;

FIG. 6 is a top view of one of the ends of a bracing bar designed to connect two columns one to another by engagement of its shaped ends into the seats arranged into the mountings and which substitutes a pair of foot members;

FIG. 7 is a perspective view of the base of a table having three foot members, in the case wherein its table-top is carried by two columns braced together by a cross bar connected to the bases of said columns.

Figure 1:
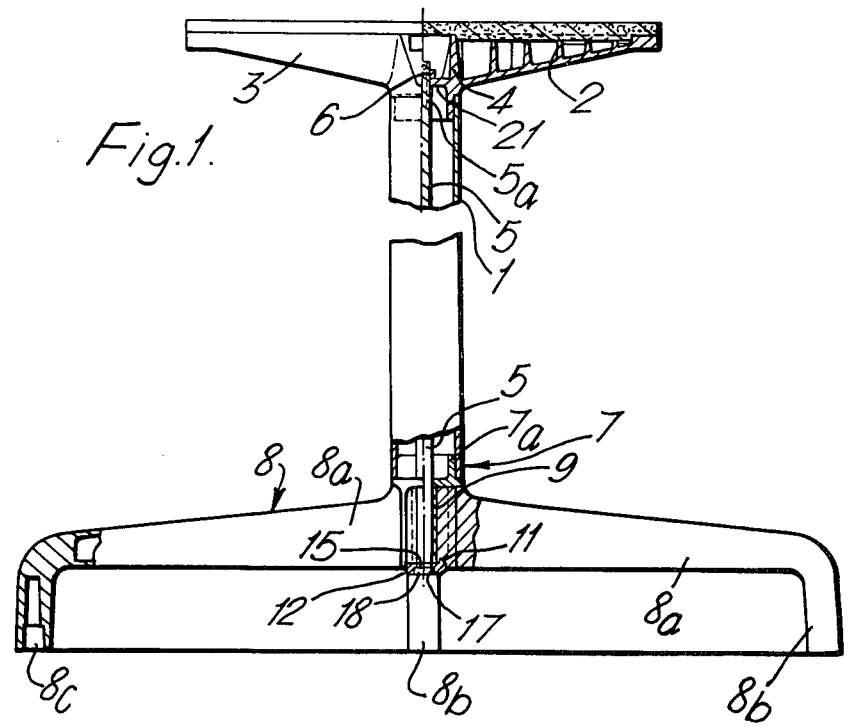
FIG. 1 is a side view, partly in section, of a table having a single central column and where the front foot member has been removed.

The table shown in FIGS. 1 to 6 comprises a tubular metal column 1, at the upper end of which is mounted a frame 2 including a plurality of arms extending radially outwardly, or having any other suitable shape and structure adapted to support the table-top 3 which is connected thereto by any dismountable system. According to the present invention said frame 2 comprises at its central upper part a recess 4 designed to house the threaded end 5a of a vertical through rod or bar 5, as well as its threaded locking nut 6.

The main characteristic of this table concerns the base of each column, where is dismountably mounted a central mounting or fitting, generally indicated 7 and so shaped as to be connected with a plurality of foot members, generally marked 8, by means of a plurality of groove and tongue joints.

According to the shown embodiment, into the mounting 7 are arranged a plurality of groove joints angularly spaced away from each other and designed to co-operate with tongue joints arranged at one end of each foot members. Of course, a plurality of tongue joints could be also provided into the mounting 7 and co-operating groove joints would be each provided at one end of said foot members 8. In the shown embodiment the mounting 7 is provided with four groove joints, but other mountings will be available having three, five or more groove joints.

Figure 2:
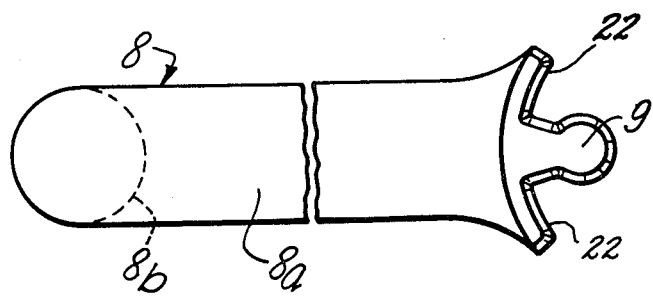
FIG. 2 is a top view, partly broken away, of one of the foot members.
Figure 3:
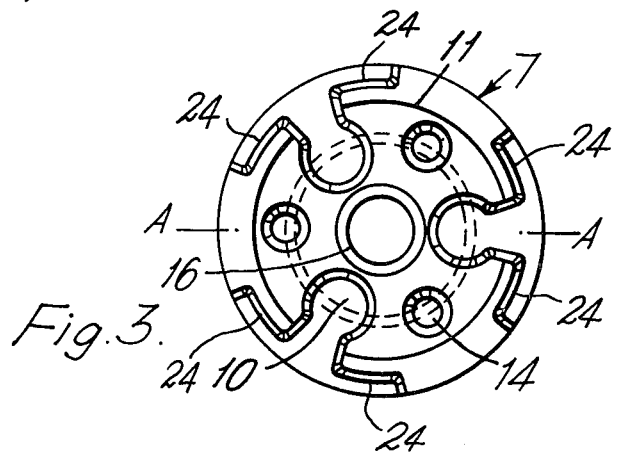
FIG. 3 is a view from below of the mounting for fitting the foot members.

Each foot member 8 is constituted of a substantially horizontal metal arm 8a which at its outer end is bent downward forming a short leg 8b at the lower end of which is provided a recess 8c for the insertion of an adjustable ground-engaging stud or the like, not shown in the drawings. At the other end the foot member 8 forms a tongue joint member 9 which is constituted of a vertical tooth having a circular cross section of a centre angle sligtly exceeding 130°, said tooth 9 having a conical upwardly tapered outer surface; and said tongue joint member 9 further comprises two lateral male sector arms 22 extending laterally beyond the side walls of said foot member 8, as best shown in FIG. 2 for insuring lateral stability for each foot member under loads as is inherent with such construction as shown herein. The conical tooth and lateral male sector arms 22 forming a three-arm bearing surface configuration for each of said cooperating groove joints. The male sector arms 22 are in contacting engagement with a pair of recesses 24 extending from opposite sides of each of said groove joints.

The mounting 7, which is preferably shaped by means of a die-casting process, is connected, in any demountable manner, at the lower end of the tubular column 1. For instance, at its upper part, said fitting or mounting 7 extends upward with a projection 7a to be inserted into the inner cavity of the column 1, while into its peripheral portion a plurality of groove joint members 10 are arranged which are complementary to the tongue joint members 9, said grooves 10 having closed upper ends and open lower ends through which can enter said tongue joint members 9 respectively, while the height of said grooves 10 is slightly greater than that of the teeth 9, which can be inserted into said grooves 10 from through their lower open ends and which can be forced upwards, so that they stop therein by a friction effect, owing to the conical configuration of said mating members 9 and 10. At the lower part of the body 7 is further arranged a cylindrical recess 11 coaxial with the column 1 (FIGS. 1, 3 and 4) and having such a diameter as to circumscribe at least partially the entrance orifices to the grooves 10. This recess 11 is provided to receive a washer or a boss 12 which after its fitting therein prevents that the co-operating grooves and tongues 10 and 9 can be mutually disengaged. From the upper surface of the boss or the like 12 facing the recess 11 extends upwardly an excentric notch 13 designed to be engaged into one of a number of dead holes 14 bored into the lower portion of the mounting 7, said notch preventing any rotation of said boss 12. Said boss 12 is further provided with an axial hole 15 designed to come into register with an axial hole 16 bored across the mounting 7 as well as with the axial hole of the tubular column 1 and with an other hole 21 bored through the frame 2 and which opens into the recess 4. At its lower end the hole 15 enlarges forming a poligonal recess 17 into which mates the poligonal head 18 of the through rod 5 having a threaded upper 5a on which is mounted the locking nut 6, said recess 17 and head 18 having, for instance, a square cross section.

For the assembly of the table, firstly the frame 2 is fixed by suitable means on the upper end of the column 1 while at the lower end of this latter will be fixed a mounting 7 which is provided with the desired number of groove joint members 10. Into each of said grooves 10 is respectively inserted from below the tongue joint member 9 of each of the foot members 8, forcing each tongue joint member 9 into the respective groove joint member 10. Subsequently will be mounted the boss 12 letting the notch 13 enter one of the dead holes 14. At last is inserted the long threaded rod 5 engaging its poligonal head 18 into the recess 17, while its upper end 5a comes out into recess 4 of the frame 2, where is inserted and screwed on said rod 5 the nut 6 so that all the components are firmly connected together. Then will be mounted the table-top 3 which will be fixed to said frame 2 by any suitable means. Furtherly may be mounted underneath each foot member 8 adjustable ground-engaging studs or the like, which are inserted into the recesses 8c.

In the case wherein a table has to be composed provided with two or more carrying columns, each supported by foot members 8 extending radially outwardly from each column base (FIG. 7), at least one of said foot members 8 is substituted by a cross bar member 19 having inserted end pieces 20 having end members 9a identical to the tongue members 9. The assembly and disassembly of said cross member 19 is performed as has hereinbefore been described with respect to each foot member 8.

It will be apparent that tables can be composed having several columns arranged in a line or so positioned as to form in plan the vertices of a polygon, in particular a rectangle, wherein some foot members 8 are substituted by as many cross members or bars 19. In this case it is preferred to use tubular metal bars 19 at the ends of which are provided inserted pieces 20 in which the tongue joint members 9a and sector arms 22a are shaped by means of a die-casting process.

I claim:

1. A disassemblable table structure comprising at least one vertical column, and at least one table top on one end of said column and a plurality of foot members having side walls and extending radially outwardly from the lower end of said column to support said column, each of said radial foot members being connected to said column by means of a removable base mounting comprising a plurality of groove joints circumferentially spaced from each other and adapted to engage complementary conical tapering male tongue joint members on the inner end of each foot member, and a vertical rod adapted to be inserted through said base mounting to connect said foot members and base mounting to said column, said plurality of groove joints of said base mounting including a number of circumferentially spaced female grooves which conically taper upwardly and have closed upper ends and open lower ends, and including a pair of recesses for each of said grooves extending from opposite sides of said grooves and facing outwardly of said base mounting; said female grooves adapted to receive the male complementary shaped, conical tapering tongue joint members disposed at said inner end of each of said foot members, each of said tongue joint members further having two lateral male sector arms, adjacent said conical tapering male tongue joint member, which extend laterally beyond the side walls of said foot member so as to extend circumferentially about a substantial peripheral sector portion of said base mounting and are adapted to engage said recesses extending from opposite sides of said groove to ensure greater lateral stability of each foot member under a load on said table top; whereby with a plurality of bases for said columns employing the same or a different number of groove joints, tables of different designs can be structured to form in plan various polygonal shapes.

2. A disassemblable table in accordance with claim 1, wherein each foot member further includes a substantially horizontal arm, which at its outer end is bent downward, and said base mounting including a boss adapted to fit into a recess provided in the bottom of said base mounting and said boss capable of at least partially closing the lower open ends of said grooves in order to prevent the grooves and tongue joint members from being disengaged from each other when the foot members are in their operative position.

3. A disassemblable table in accordance with claim 2, wherein the table top, the column, the base mounting and the boss associated therebetween are each provided with an axial hole, said holes, as aligned, being adapted to receive said vertical rod, said rod being provided with an enlarged head and with a threaded free end cooperating with a locking nut, said table top being provided with a recess designed to come into register with the axis of the column and into which is received the threaded end of the said rod and its associated nut, and means being provided to prevent rotation between the rod and the base mounting.

* * * * *